July 24, 1956 F. J. KOMERSKA 2,756,091
MILITARY STORES RACK
Filed Oct. 29, 1951 2 Sheets-Sheet 1
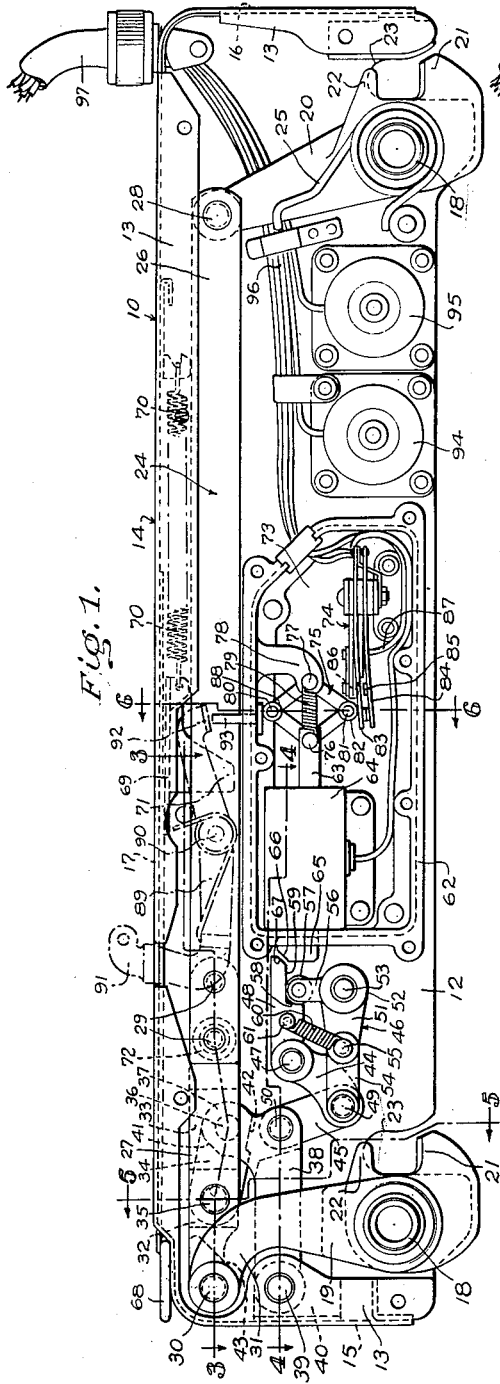
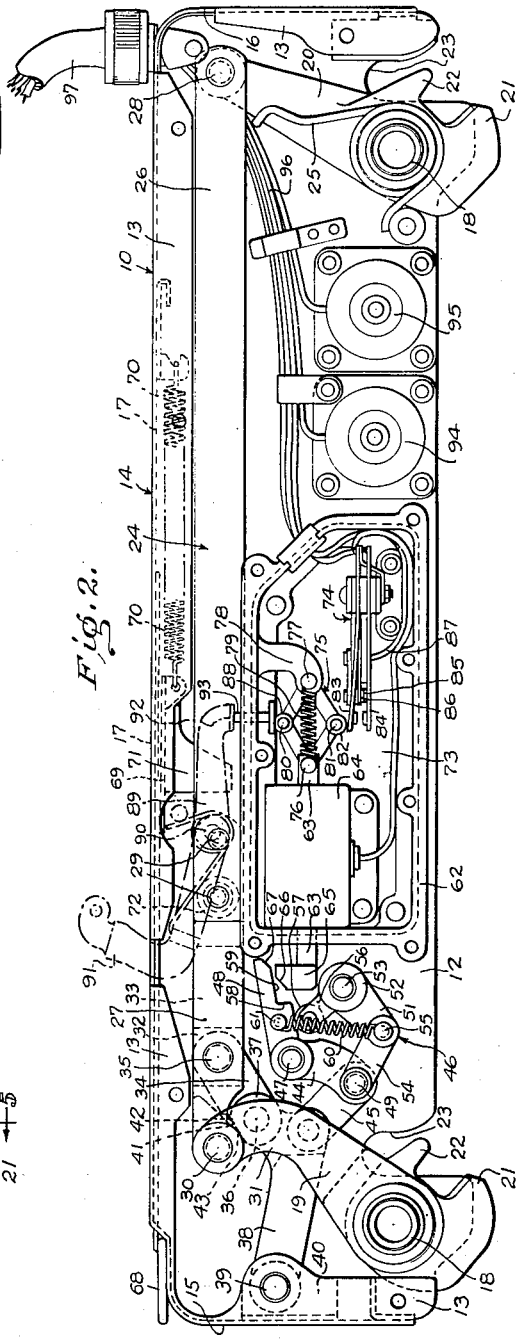
Frank J. Komerska
INVENTOR
BY Reginald W. Hoagland
ATTORNEY July 24, 1956  F. J. KOMERSKA  2,756,091
MILITARY STORES RACK
Filed Oct. 29, 1951  2 Sheets-Sheet 2

Frank J. Komerska
INVENTOR

BY Reginald W. Hoagland
ATTORNEY

United States Patent Office 2,756,091
Patented July 24, 1956

2,756,091

MILITARY STORES RACK

Frank J. Komerska, Grosse Pointe Woods, Mich., assignor to Ainsworth Manufacturing Corporation, Detroit, Mich., a corporation of Michigan Application October 29, 1951, Serial No. 253,652

2 Claims. (Cl. 294—83)

This invention relates to racks for the suspension and release of stores and more particularly to a novel and improved rack for carrying and dropping bombs, empty auxiliary gas tanks, and other military stores from aircraft.

Heretofore, the general practice in the construction of bomb racks has been to employ a locking and releasing mechanism with movable parts thereof provided with surfaces that slidably contact and disengage one another during releasing operation of the rack. Such constructions require additional mechanisms to reset the movable parts to their load-supporting position and have resulted in the galling of the contacting surfaces by frictional pressure thereon, thus retarding and sometimes preventing proper actuation of the release. With the use of faster aircraft and larger bombs, which are constantly being demanded, the locking and releasing mechanism of the racks will be subjected to still greater inertia forces and weights, thereby increasing frictional pressures on the surfaces.

It is therefore an object of the invention to provide a rack with a locking and releasing mechanism composed of a number of levers and links supported and connected together by pivots and link pins and arranged relative to one another so that the weight on load-carrying hooks is gradually diminished throughout the chain of levers and links until the load is reduced to zero pressure where the mechanism is positively locked and where a quick trigger action is applied to immediately release the load.

Another object of the invention is to provide a locking and releasing mechanism whereby resetting of the mechanism can be accomplished without the aid of auxiliary mechanisms because of continuity of linkage.

A further object of the invention is to provide a rack in accordance with the preceding objects wherein a toggle linkage constitutes the final reduction of load pressure and comprises an essential part of the positive locking element for the hooks.

Another object of the invention is the provision of a rack as set forth in the preceding objects wherein a movable safety arm is resiliently connected to and yieldably held in the path of movement of a part of the toggle linkage for preventing a plunger of a solenoid from breaking the toggle linkage until after said arm has been engaged by the plunger and actuated out of the path of movement of the toggle linkage part.

A still further object of the invention is to provide a rack in which a spring-returned rack-tripping element of an electrically operated device actuates a rack switch through the medium of parallelogram linkage to close and open contacts of the rack switch in circuits to the electrically operated device of the same rack and to an electrically operated device of another rack of a train of racks, and in which manual power can be applied to the parallelogram linkage to actuate the rack-tripping element and the rack switch.

It is also an object of the invention to provide a rack of the above-indicated character which is substantially constructed, which can be manufactured economically, and which will be thoroughly efficient and practical in use.

These, together with various auxiliary features and objects of the invention which will later become apparent as the following description proceeds, are attained by the present invention, a preferred embodiment of which has been illustrated, by way of example only, in the accompanying drawings, wherein:

Figure 1 is a side elevation of the present invention with a side plate of the casing removed, showing the parts in locked position;

Figure 2 is a similar view, showing the parts in unlocked or release position;

Figure 3:
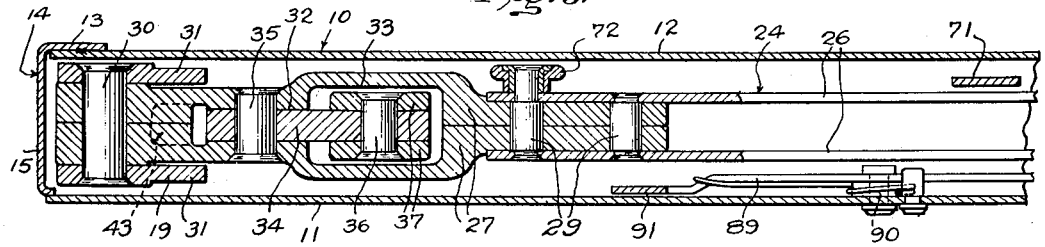
Figure 3 is a fragmentary longitudinal section taken on line 3—3 of Figure 1.
Figure 4:
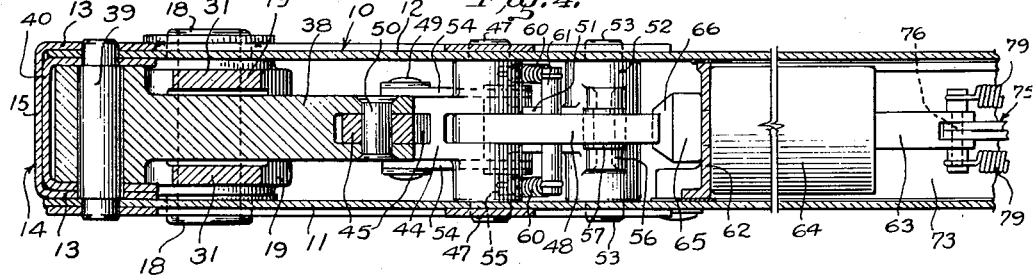
Figure 4 is a similar section taken on line 4—4 of Figure 1.
Figure 5:
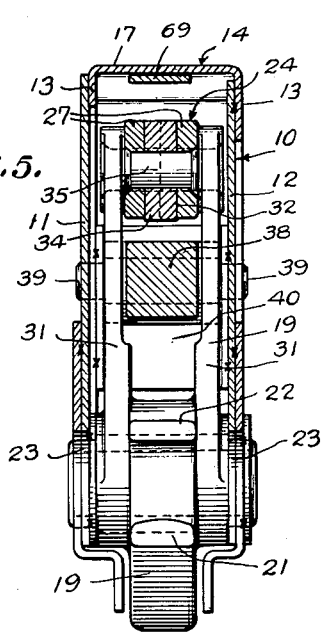
Figure 5 is a vertical transverse section taken on line 5—5 of Figure 1.

Referring now more specifically to the accompanying drawings, wherein like numerals designate similar parts throughout the various views, the numeral 10 indicates an open bottom casing constructed of sheet metal and comprising a pair of elongated side plates 11 and 12 attached along their ends and upper edges to inturned flanges 13 of a spacer frame 14 providing a forward end wall 15, a rearward end wall 16, and a top wall 17. The side plate 11 is attached to the outer sides of one set of flanges by screws or other sutable fasteners for removal of said plate, while the other side plate 12 is permanently secured to the inner sides of the other set of flanges 13 by welding or the like. On the outer sides of the plates 11 and 12, between the flanges 13 of the spacer frame 14, and between the side plates 11 and 12, suitable stiffening and reinforcing elements are rigidly secured to parts of the casing providing a rugged structure for housing and supporting other parts of the rack.

In the casing 10 and protruding slightly through the open bottom thereof near the respective end walls 15 and 16 and pivotally mounted on sleeves 18 are the lower ends of substantially vertically arranged load-carrying and releasing levers 19 and 20. The sleeves 18, through which bolts (not shown) extend for attaching the rack in position on an airplane, have the ends thereof reduced in diameter and received in openings in the side plates 11 and 12 thereby providing shoulders on said sleeves that engage the inner sides of said plates for preventing end movement of the sleeves. By bolting the sleeves 18, on which the load-carrying levers 19 and 20 are pivoted, direct to structural parts of the airplane, it can be seen that the walls of the casing are not subjected to the entire weight and inertia forces of military stores being supported by the levers. The levers 19 and 20 at their pivotal connections to the casing are enlarged and the rear portions of said enlargement in line horizontally with the center of the pivots are notched providing a rearwardly directed hook 21 with a projection or lip 22 spaced thereabove on each of said levers. Between the hooks 21 and lips 22 and in recesses 23 provided in the lower marginal portions of the side plates 11 and 12, loops or eyes which are a part of the military stores (not shown) are received during load-carrying positions of the levers.

The upper free ends of the levers 19 and 20 are interconnected by a longitudinally extending link assembly 24 to hold said levers in positions relative to one another and to cause the levers to move in unison to and from load-carrying positions, there being a spring 25 applying pressure to the lever 20 tending to hold the levers in the load-released position, as shown in Figure 2. The link assembly 24 is composed of two pairs of bars 26 and 27, the bars 26 being arranged in spaced parallel relation to each other and having adjacent ends thereof pivotally connected to opposite sides of the lever 20 by a pin 28, while the pair of bars 27, which are of much heavier construction and are arranged side by side in engagement with one another, have ends thereof rigidly secured together and between the opposite ends of the spaced bars 26, by rivets or the like 29, with the major portions thereof extending beyond the bars 26 and pivotally connected by a pin 30 between bifurcations 31 of the lever 19, as best shown in Figure 3.

In adjacent sides of the bars 27 intermediate their contacting ends are provided stepped recesses located to the side of one another to form communicating vertically extending openings 32 and 33 through the link assembly 24. The opening 32, which is of less width than the opening 33, has received therein one end of a short link 34 that is pivotally connected by a pin 35 to the bars 27. Pivotally connected by a pin 36 to the other end of the short link 34 and adapted to be moved into and out of the larger opening 33 are upturned extensions 37 of a forked end of a substantially horizontally arranged arm 38 which has its opposite end pivotally mounted on a pin 39 extending through the casing 10 and a reinforcing bracket 40 fixed to said casing. The forked extensions 37 of the arm 38 and the link 34 at the pivot 36 have flat abutting surfaces 41 and 42, respectively, thereon that contact an abutment 43 at the end of the opening 32, as shown in Figure 2, for limiting movement of the interconnected levers 19 and 20 upon arriving at their release position.

Through the medium of the link 34 and arm 38 connection of the interconnected levers 19 and 20 to the casing 10, the pounds pressure to move the arm 38 downwardly on its pivot 39 to permit the levers to move to their release position is materially reduced from that of the pounds pressure applied direct to the levers. By referring to Figure 1 which shows the rack in load-supporting position, it will be observed that the arm 38 extending between the bifurcations 31 of the lever 19 closely underlies the ends of the bars 27 pivoted to the lever 19, that the pivotal connection 39 of the arm 38 to the casing 10 is located in close proximity to the pivotal connection 30 of the lever 19 to the bars 27, and that the pivots 30, 35, and 36 are but slightly out of alignment, thus producing angled relations of locations of pivotal bearings that reduce the pounds pressure in a downwardly direction to the arm 38.

From the foregoing, it can be seen that the weight of the load on the levers 19 and 20 and the spring 25 tend to move the upper ends of the levers 19 and 20 to the right, moving the link assembly 24 endwise from the position shown in Figure 1 to the position shown in Figure 2 and, due to the locations of pivotal connections of the link 34 and arm 38, such endwise movement can be accomplished only upon a lowering of the arm 38 on its pivot 39 to the casing. Therefore, to control movement of the arm 38 and to hold the levers 19 and 20 in load-supporting position, as shown in Figure 1, there is provided a second pivoted arm 44 with a depending end thereof connected to the arm 38 by a link 45 and also connected to a toggle mechanism 46 capable of locking the arm 44 against movement. The arm 44, like the arm 38, is pivotally supported on the side walls 11 and 12 of the casing by a pin 47 and is forked at both its upper pivoted end and its lower free end for receiving and pivotally connecting at its upper pivoted end with the pin 47 one end of a rearwardly extending safety arm 48, presently to be described, and for receiving and pivotally connecting at its opposite or lower end the lower end of the link 45 with a pin 49. The connection of the other or upper end of the link 45 to the arm 38 is made by receiving the link in the forked end of the arm below the pivotal connection to the upturned extensions 37 and pivoting the same on a pin 50.

The toggle mechanism 46 which extends rearwardly from the depending end of the arm 44 consists of one arm 51 of a substantially right-angled bell crank 52 pivoted by a pin 53 to the side plates 11 and 12 of the casing and a pair of spaced links 54 pivoted to the arm 51 by a pin 55 and also pivotally connected to the ends of the pin 49 that connects the arm 44 to the link 45. The other arm 56 of the bell crank 52 projects upwardly and has rotatably mounted in the upper end thereof a roller 57 which engages a shoulder 58 and a face 59 at right angle to said shoulder on the safety arm 48 when the levers 19 and 20 are in load-supporting position, there being a pair of coil springs 60 with the opposite ends thereof connected to the pin 55 and to the ends of a cross pin 61 projecting through the safety arm for yieldably holding the safety arm down on the roller 57 and the toggle up in locking position with the end of the arm 51 in engagement with a side of the arm 44.

In horizontal alignment with the roller 57 and protruding through an opening in a wall of a substantially rectangular frame 62 is a plunger 63 of a solenoid 64 within said frame. An enlarged head 65 is secured on the plunger 63 exteriorly of the frame 62 and is adapted to engage the roller 57 to swing the bell crank 52 on its pivot 53 and move the pivotally connected ends of the arm 51 and links 54 out of alignment with the pivots 49 and 53, thereby unlocking the levers 19 and 20 from their load-supporting position. Prior to engagement of the head 65 with the roller 57, an angled face 66 on the head engages a similar angled face 67 on the end of the safety arm 48 and cams the safety arm upwardly to move the shoulder 58 out of the path of movement of the roller when engaged by the head of the plunger.

It may be generally stated now that when the loops or eyes of military stores are raised into the recesses 23 at opposite ends of the casing 10, said loops will be guided during their upward movement into engagement with the lips 22 on the levers 19 and 20, and further upward movement will cause the levers 19 and 20 to be swung simultaneously counterclockwise engaging the hooks 21 into the loops. Due to the continuity of linkage throughout the mechanism, such movement of the levers 19 and 20 will reset or cock the rack in load-supporting position without the aid of auxiliary mechanisms, and when cocked, one may rest assured that all parts are in correct relative positions to one another and will remain in such positions during both carrying and releasing of military stores.

A manual cocking structure of known type is shown associated with the improved rack. Said cocking structure comprises a finger-engaging ring 68 connected to a slide 69 normally held in a rearward position by a spring 70 and provided with a downwardly extending finger 71 adapted to engage a roller 72 on one side of the link assembly 24 for moving the link assembly endwise upon the exertion of a pull on the ring 68. Although this type of manual cocking or resetting mechanism is shown, it is to be understood that any other type may be employed which is capable of moving the interconnected levers 19 and 20 to load-supporting position against tension of the spring 25.

The substantially rectangular frame 62, previously referred to, is located approximately midway of the length of the rack between the side plates 11 and 12, being permanently secured to the fixed side plate 12 and detachably fastened to the removable side plate 11 for providing a completely closed housing 73 within the casing 10. It is in this housing that the previously mentioned solenoid 64, together with a rack switch 74 and an actuating mechanism 75 for said switch and solenoid, is located and protected from outside elements. The actuating mechanism 75 consists of a parallelogram of four links pivotally connected together and with opposite connections thereof pivoted, as at 76, to the end of the plunger 63 opposite to that having the head 65 thereon and, as at 77, to a fixed arm 78 of the frame 62. A pair of coil springs 79 with the opposite ends connected at the pivots 76 and 77 yieldably holds the plunger 63 in its nearest position towards the arm 78 with the other pair of pivotal connections 80 and 81 extended in their highest and lowest positions, respectively, and the head 65 on the plunger 63 out of engagement with the roller and the safety arm 48, as shown in Figure 1.

Figure 6:
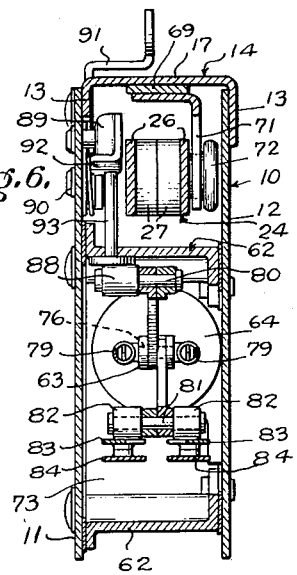
Figure 6 is also a vertical transverse section and is taken on line 6—6 of Figure 1.

On the pin that provides for the pivotal connection 81 of the parallelogram linkage is mounted a pair of rollers 82 of insulation material, as shown in Figures 1, 2, and 6, that normally engage and force downwardly a pair of spring fingers 83 of the rack switch 74 for making contact with and also forcing downwardly another pair of spring fingers 84 of the switch. The forcing of the lower fingers 84 downwardly disengages a contact 85 on one of the fingers 84 from another contact 86 insulated from the remainder of the switch 74 and having the wire 87 connected thereto. The contacts on the fingers 83 and 84 that engage and disengage one another according to the position of the parallelogram linkage 75 are wired in the circuit that energizes the solenoid 64 for forcing the plunger 63 to the left against tension of the springs 79, while the contacts 85 and 86 are wired in the circuit to a similar solenoid in another rack of a train of racks to prevent releasing of two racks at the same time. This type of rack switch 74 is old in the art and an illustration and description thereof has been made only for the purpose of association of elements.

Also shown associated with the parallelogram linkage 75 for engagement with a roller 88 on the pivot pin 80 is a mechanical release mechanism previously used on racks, consisting of a lever 89 pivoted intermediate its ends on a pin 90 to the side plate 11 and having an end 91 extending through the top wall 17 of the casing for manual operation. The opposite end of the lever has a shoulder 92 engageable with a pin 93 which is slidably mounted in an opening in the upper portion of the frame 92 and which is forced downwardly upon an upward pull on the end 91 of the lever 89. A head on the lower end of the pin 93 engages the roller 88 on the parallelogram linkage and applies a downward pressure on the parallelogram linkage for forcing the plunger 63 endwise to the same position it would have assumed had it been moved by energizing the solenoid.

Referring to Figures 1 and 2, the side plate 12 has secured to the inner face thereof between the housing 73 and lever 20 a nose-arming solenoid 94 and a tail-arming solenoid 95 for use when releasing explosive bombs. Wires connected to the arming solenoids 94 and 95 and other wires connected to the rack switch 74 are grouped together, as at 96, and are confined in a conduit 97 connected to and extending from the casing 10. The wires in the conduit are connected in circuits with switches (not shown) for controlling the energizing of the solenoids 64, 94, and 95.

In operation, when it is desired to release the bomb or other load carried by the mechanism, the solenoid 64 is energized and the head 65 of the plunger 63 first engages the safety arm 48 and cams the same upwardly moving the shoulder 58 thereon out of the path of movement of the arm 56 which is then engaged moving the pivot joint 55 of the toggle mechanism 46 off center and the pivoted arms 44 and 38 and links 45 and 34 to positions where they no longer act to reduce the pressure exerted thereon by the weight of the load. The interconnected hook levers 19 and 20, together with said pivoted arms and links, are then rapidly moved by the weight of the load and the spring 25 from the load-supporting position shown in Figure 1 to the release position shown in Figure 2. Due to the spring 25, the rack remains in the released position until the movable parts are manually moved to cocked or supporting position.

During movement of the plunger 63 by the energized solenoid 64, the jointed ends 80 and 81 of the parallelogram of links 75 are retracted breaking contact of the spring fingers 83 and 84 of the rack switch 74, which cuts off the flow of current to the solenoid 64 and allows the spring 79 to return the plunger to its initial position. When manually releasing the rack by exerting a pull on the lever 91, the plunger 63 assumes the same release position as it did when it was moved by energizing the solenoid, but when manually released, the downward pressure of the pin 93 on the joint 80 of the parallelogram of links causes movement of the plunger.

In view of the foregoing description taken in conjunction with the accompanying drawings, it is believed that a clear understanding of the construction, operation, and advantages of the device will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. A military stores rack including, in combination, a casing, a pair of spaced hook levers pivoted to said casing for engaging and supporting and object, means interconnecting said hook levers for forming an assembly for operation of said hook levers in synchronism to and from object-supporting position, an arm pivoted to said casing, a link pivotally connected to said arm and pivotally connected to said assembly, said arm and said link being arranged relative to one another and relative to said assembly for materially reducing the pounds pressure applied by said hook levers of the assembly to said arm when said levers are in position supporting an object, a toggle mechanism connected to said arm and to said casing for holding said arm against movement and thereby retaining the hook levers in supporting position, a second arm fixed to the toggle mechanism at its pivot to the casing, a solenoid-actuated plunger adapted to engage said second-mentioned arm and move the toggle mechanism and linkage connecting same to the assembly to positions that the toggle mechanism releases the first-mentioned arm and the reduction of pounds pressure to the first-mentioned arm is lessened and a spring-urged safety arm in the path of movement of said second-mentioned arm and cammed out of said path of movement by said plunger prior to engagement of said plunger with said second-mentioned arm.

2. A military stores rack including, in combination, a casing, a pair of spaced hook levers pivoted to said casing for engaging and supporting an object, means interconnecting said hook levers for forming an assembly for operation of said hook levers in synchronism to and from object-supporting position, an arm pivoted to said casing, a link pivotally connected to said arm and pivotally connected to said assembly, said arm and said link being arranged relative to one another and relative to said assembly for materially reducing the pounds pressure applied by said hook levers of the assembly to said arm when said levers are in position supporting an object, a toggle mechanism connected to said arm and to said casing for holding said arm against movement and thereby retaining the hook levers in supporting position, a second arm on said toggle mechanism and projecting therefrom, a safety arm pivoted to said casing and having a shoulder thereon in the path of movement of said second-mentioned arm of the toggle mechanism, a coil spring connected to the joint of the toggle mechanism and to said safety arm for yieldably holding the toggle mechanism extended and the shoulder of said safety arm in the path of movement of the second-mentioned arm of the toggle mechanism, and an actuated plunger adapted to engage said safety arm and cam same to a position whereby the shoulder is out of the path of movement of the second-mentioned toggle arm prior to engaging said second-mentioned arm and moving said toggle mechanism and linkage connecting same to the assembly to positions whereby the hook levers may be moved out of object-supporting position.

References Cited in the file of this patent

UNITED STATES PATENTS

| | | |
|---|---|---|
| 2,341,456 | Markey | Feb. 8, 1944 |
| 2,416,028 | Sloan | Feb. 18, 1947 |
| 2,473,597 | Leland | June 21, 1949 |
| 2,534,744 | Wardwell | Dec. 19, 1950 |
| 2,534,745 | Wardwell | Dec. 19, 1950 |
| 2,571,381 | Potter | Oct. 16, 1951 |